United States Patent
Dagh et al.

[11] Patent Number: 5,568,846
[45] Date of Patent: Oct. 29, 1996

[54] WHEEL HUB AND BRAKE DISK ARRANGEMENT FOR HEAVY TRUCKS

[75] Inventors: Ingemar Dagh, Hisingsbacka; Jan-Olof Bodin, Alingsås, both of Sweden

[73] Assignee: AB Volvo, Gothenburg, Sweden

[21] Appl. No.: 256,797

[22] PCT Filed: Jan. 22, 1993

[86] PCT No.: PCT/SE93/00043

§ 371 Date: Sep. 14, 1994

§ 102(e) Date: Sep. 14, 1994

[87] PCT Pub. No.: WO93/14945

PCT Pub. Date: Aug. 5, 1993

[30] Foreign Application Priority Data

Jan. 24, 1992 [SE] Sweden ................... 9200202

[51] Int. Cl.⁶ .................. B60B 27/02; F16D 65/12
[52] U.S. Cl. ................ 188/218 XL; 188/264 AA
[58] Field of Search .......... 188/218 XL, 264 A, 188/264 AA

[56] References Cited

U.S. PATENT DOCUMENTS

| | | | |
|---|---|---|---|
| 2,690,248 | 9/1954 | McDowall | 188/218 XL |
| 2,850,118 | 9/1958 | Byers | 188/218 XL |
| 2,916,105 | 12/1959 | Dasse et al. | 188/218 XL |
| 3,295,640 | 1/1967 | Beuchle | 188/218 XL |
| 3,621,945 | 11/1971 | Spry | 188/218 XL |
| 4,102,438 | 7/1978 | Rancourt | 188/218 XL |
| 4,280,609 | 7/1981 | Cruise | 188/218 XL |
| 5,101,953 | 4/1992 | Payvar | 188/218 XL |

FOREIGN PATENT DOCUMENTS

| | | | |
|---|---|---|---|
| 2154933 | 11/1978 | Germany | 188/264 AA |
| 0006437 | 1/1984 | Japan | 188/218 XL |
| 1309633 | 3/1973 | United Kingdom | 188/218 XL |

*Primary Examiner*—Matthew C. Graham
*Attorney, Agent, or Firm*—Young & Thompson

[57] ABSTRACT

A wheel hub and brake disc arrangement for a vehicle wheel, comprising a hub rotatably carried on a shaft portion and presenting an outwardly facing region of non-circular cross-section, and a brake disc which is carried by this region of the hub. The brake disc having a central hole, the shape of which is adapted to the shape of the non-circular cross-section thereby to provide a mutually non-rotatable attachment of the brake disc to the hub. The non-circular region of the hub comprises closely spaced V-shaped ridges (10) and troughs (11), and the central hole of the brake disc is provided with corresponding V-shaped troughs (13) and ridges (14) which are so adapted in relation to the ridges and troughs on the hub that a slip fit between the hub and disc is achieved. The depth of the troughs is greater than the height of the ridges, so that there is a substantial gap between the bottoms of the troughs and the tops of the ridges.

11 Claims, 3 Drawing Sheets

WHEEL HUB AND BRAKE DISK ARRANGEMENT FOR HEAVY TRUCKS

The present invention relates to a wheel hub and brake disc arrangement for a vehicle wheel, comprising a hub rotatably carried on a shaft portion and presenting an outwardly facing region of non-circular cross-section, and a brake disc which is carried by said region of the hub, said brake disc having a central hole, the shape of which is adapted to the shape of said non-circular cross-section to thereby provide a mutually non-rotatable attachment of the brake disc to the hub.

Brake discs for disc brakes have previously predominantly been attached to their hubs in either of two ways, namely either by being manufactured as an integral part of the hub or by being securely screwed to a circular flange on the hub. The former method is essentially restricted to brakes for lighter vehicles, whilst the latter is also suitable for medium-sized trucks, for example trucks up to 16 tonnes in weight. For the heaviest class of truck, drum brakes have until now been almost exclusively used due i.e. to the extremely high braking torque (around 2000 kpm) in combination with the brake shoes which apply the braking effect creating problems. More specifically, these problems are due to, on the one hand, the intense heating up of the brake disc as a result of the high braking force causing the disc to warp or upset because of its rigid attachment to the hub to thereby affect its alignment with the brake caliper and, on the other hand, the force applied to the disc causing warping of the stub axle assembly, which also affects the alignment of the brake disc with respect to the brake caliper. Both of these factors contribute to large stresses in the disc and wear to both the disc and brake pads. With conventional attachment of the brake disc to a wheel axle, it is possible that with heavier vehicles the deformation of the wheel axle which can arise during cornering can result in such misalignment between the disc and brake caliper that wear occurs.

A wheel hub and brake disc arrangement of the type according to the preamble of claim 1, which at least partially addresses some of the above-mentioned negative effects of a rigid attachment between the brake disc and the hub when subjected to intense heating, has previously been proposed for e.g. use in competition, i.e. for light vehicles. An arrangement of this type is shown and described in DE-OS 1 800 161 in which a three or four cornered transmission ring is attached to the hub, with the corners engaging in corresponding recesses in the central hole of the brake disc. In addition to the advantage that, during heating, the disc can expand radially without warping, the arrangement also allows the disc to be quickly replaced, a not insignificant advantage for competition use.

Starting out from previously known interlocking connections between a wheel hub and a brake disc, the object of the present invention can generally be said to develop a hub and brake disc arrangement which can replace previously employed drum brakes for the heaviest class of vehicles.

More precisely, the object is to provide an interlocking connection between a hub and brake disc which has a shape on the non-circular cross-section of the support surface of the hub and around the central hole of the disc which is optimal as regards the fracture forces exerted on the disc and the shear and bending stresses on the cross-section region, at the same time that the risk of the disc jamming on the hub is eliminated.

This is achieved in accordance with the present invention by a wheel hub and brake disc arrangement of the earlier mentioned type which is characterized in that said non-circular region of the hub comprises closely spaced V-shaped ridges and troughs, and in that the central hole of the brake disc is provided with corresponding V-shaped troughs and ridges which are so adapted in relation to the ridges and troughs on the hub that a slip fit between the hub and disc is achieved. It has been shown that by providing the non-circular cross-section region with closely spaced V-shaped ridges and troughs, the level of the radial frature stresses on the disc as well as the shear and bending stresses on the shaped region can be maintained at an acceptable level, at the same time that the risk of jamming is eliminated, even with the very high braking forces which can arise in the heaviest vehicle class.

Trials have shown that the lead angle of the flanks of the ridges (10, 14) should preferably lie between 40° and 65°, and that the lowest levels of shear and bending stress on the ridges occur at an angle of 52°.

In a preferred embodiment of the arrangement according to the invention, uniform ally spaced axial bores are provided around the central hole of the disc radially inside of at least certain troughs in the disc and communicate with the base of respective adjacent troughs via slots in the disc. In this manner, thermal stresses are avoided at the radial inner hub region of the disc when the braking surface of the disc is subjected to an extreme temperature increase during braking and thus reaches a temperature which initially is substantially higher than the temperature of the hub region.

In a further development of the arrangement according to the invention, a circular channel, open on one side of the hub, is provided in the hub radially inside of the region provided with ridges and troughs. The circular channel serves to restrict heat transfer from the disc to heat-sensitive components, such as bearings and the like, located radially inwardly of the disc.

The invention will be described in greater detail by way of example and with reference to the attached drawings, in which.

Figure 1:
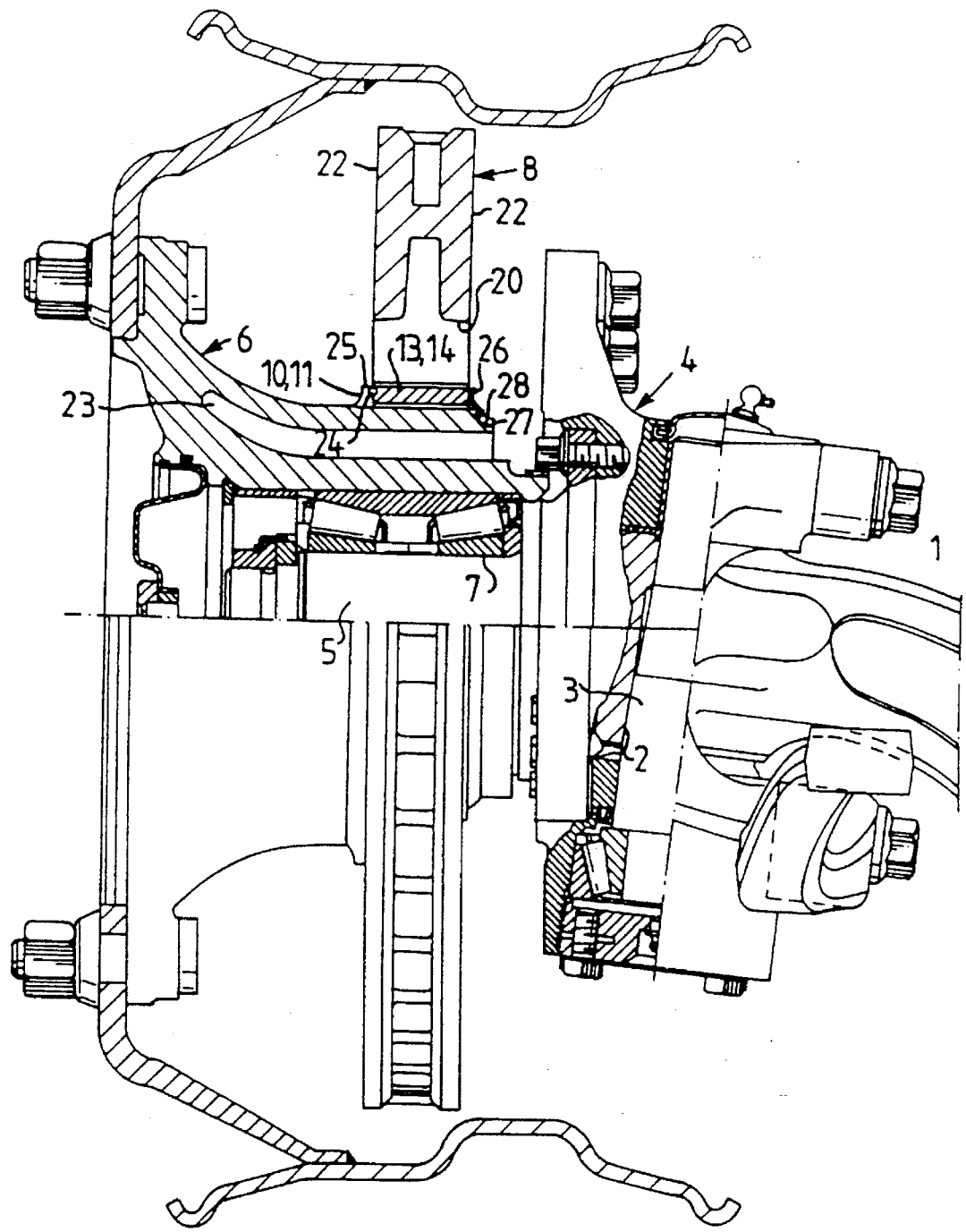
FIG. 1 shows a partial sectional elevational view of a wheel axle with a hub and brake disc arrangement according to the invention.

In FIG. 1, reference numeral i denotes an outer end of a rigid front axle of a truck. The end of the axle presents a conical recess 2 in which a king pin 3 is affixed. A stub axle assembly 4 is pivotally carried on the king pin 3. The stub axle assembly 4 comprises a stub axle 5 on which a wheel hub 6 is carried by means of a bearing assembly 7. The hub 6 carries a brake disc 8 and the stub axle assembly 4 a not-shown brake caliper or actuation mechanism.

Instead of attaching the brake disc to the hub by means of the previous most common method, i.e. securely screwing the disc to a flange on the hub, according to the embodiment of the present invention the disc is affixed to the hub by means of an interlocking connection. To achieve this, the hub 6 is provided with a central region which has a cross section which deviates from a true circle. More exactly, the region is provided with closely spaced V-shaped ridges 10 and troughs 11. The radial inner hub region 12 of the brake disc S is provided with corresponding troughs 13 and ridges 14 which are adapted to cooperate with the ridges 10 and troughs 11 of the hub.

Figure 3:
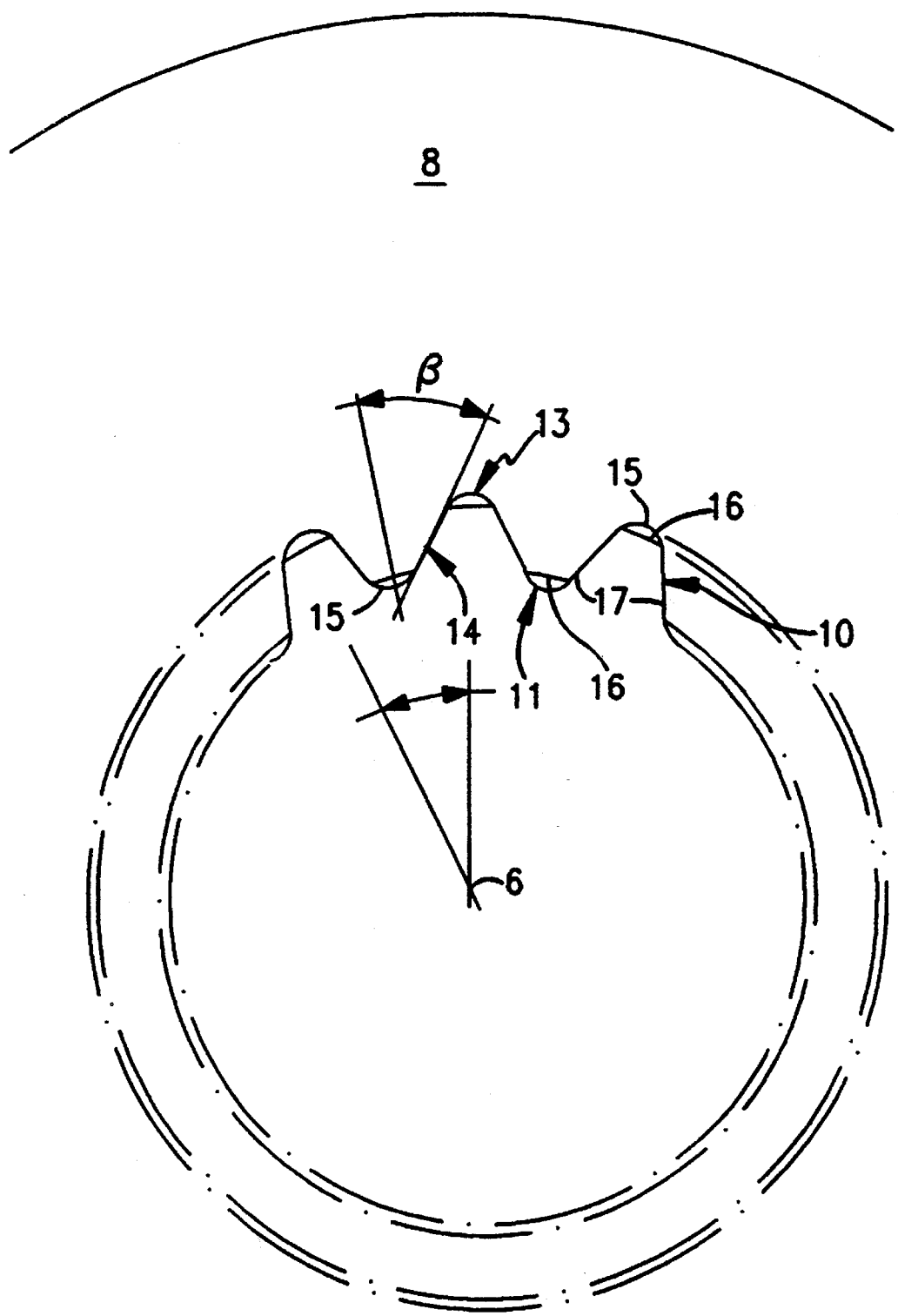
FIG. 3 is a schematic end view of a section of the inner region of the hub and the disc.

As is particularly evident from FIG. 3, the depth of the troughs 11, 13 is somewhat greater than the height of the ridges 10, 14. The troughs have a rounded base 15 whilst the ridges have a flat upper face 16 merging with flat flanks 17. Such a construction ensures surface contact over the entire flank surface of the ridges. The disc 8 and the hub 6 are so dimensioned that, in an unloaded condition, a gap of 0.2–0.3 mm is present between cooperating flanks 17 on the disc and hub. In the shown embodiment the hub and disc both have eighteen troughs and ridges. The depth of the troughs corresponds to approximately 15% of the radius of the hole 16 in the disc. With a large number of troughs and ridges, for example thirty, the depth of the troughs can be around 5% of the radius.

Trials have shown that the bending and shear stresses on the ridges 10, 14 are lowest when the lead angle β of the flanks lies between 42°–55°. The stresses progressively increase as β falls below 42° so that the stresses at β=30° are around 30% higher than when β=42°–55° and 20% higher when β=10°.

Figure 2:
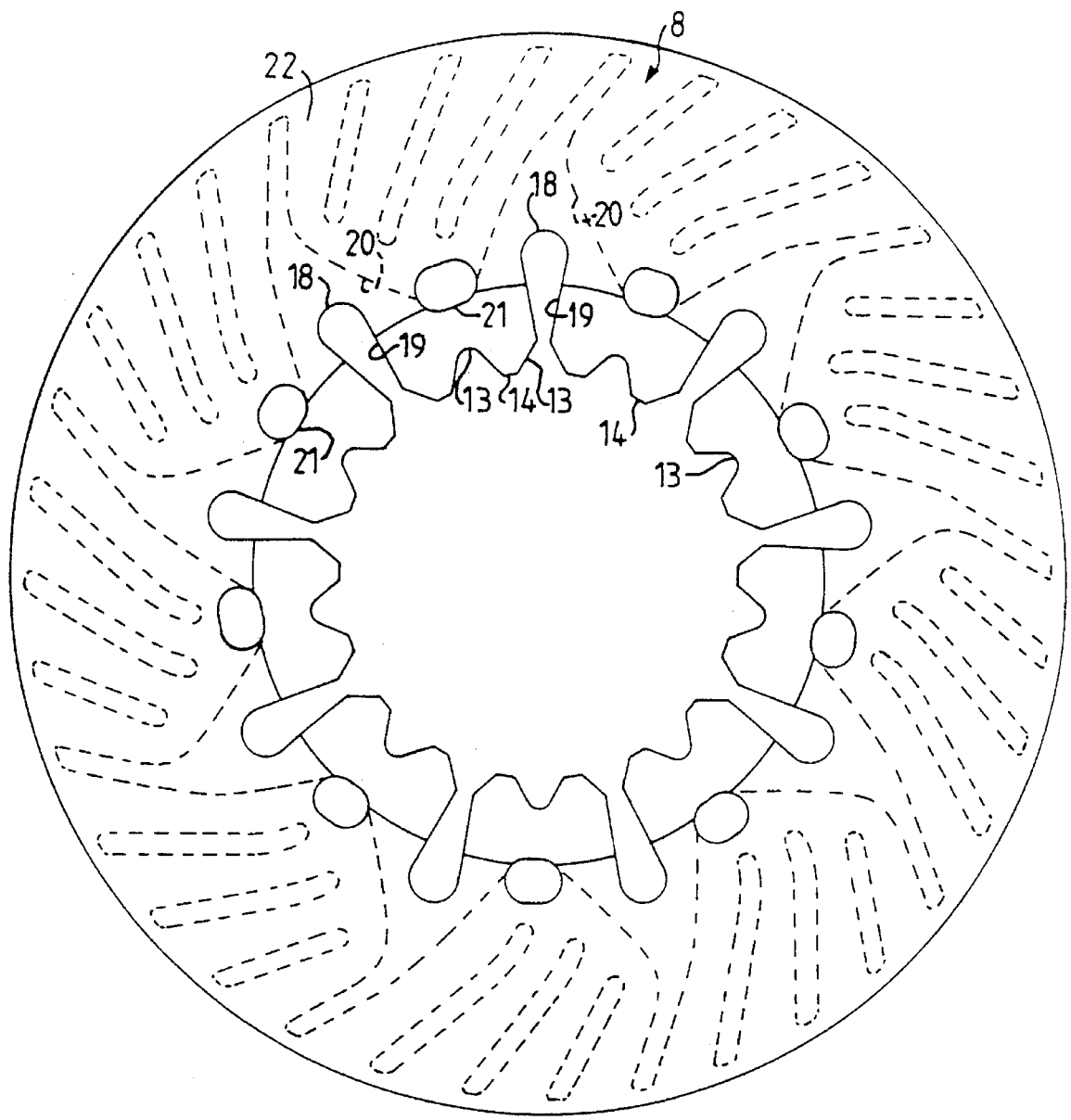
FIG. 2 is an end view of the brake disc of FIG. 1.

In the embodiment shown in FIGS. 1 and 2, the brake disc 8 is provided with axial bores 18 which are positioned radially inside of alternate troughs 13 and merge into slots 19 which communicate with the base of respective radially adjacent troughs 13. The shown disc is a so-called ventilated disc and the bores 18 with the slots 19 communicate with adjacent ventilation passages 20 in the disc. Axial bores 21 are located between the bores 18, though these bores 21 lack the corresponding slots 19. The described arrangement with bores and slots serves to minimize the risk of fracturing of the hub region of the disc during heating of the disc friction surface 22 to a temperature higher than the hub region during braking. In order to restrict the heat transfer during heating of the brake disc 8 to other components more heat-sensitive than the hub itself, for example the bearing 7, a circular channel 23, open on one side of the hub, is provided in the hub 6 radially inside of the ridges 10. In this manner, the heat transfer path through the hub material from the disc 8 to the hub region 24 which is pressed onto the bearing 7 is extended.

As can be seen from FIGS. 1 and 2, the disc 8 is totally symmetric. It is affixed to the hub 6 by means of a lock ring 25 located in a groove 24 in the ridges 10, a spring-washer 26 and a lock ring 28 located in a groove 27 formed towards the inner end of the hub. The symmetric shape and the symmetric attachment, together with the movement on the hub which the spring-washer permits, results in symmetric thermal deformation, even wear of the disc's friction surfaces, minimal risk of brake torque variations, simple assembly and minimal risk of fracture formation. This is also aided by the provision of the bores 18 with the slots 19.

We claim:

1. In a wheel hub and brake disc arrangement for a vehicle wheel, comprising a hub rotatably carried on a shaft portion and presenting an outwardly facing region on non-circular cross-section, and a brake disc which is carried by said region on the hub, said brake disc having a central hole, the shape of which is adapted to the shape of said non-circular cross-section to thereby provide a mutually non-rotatable attachment of the brake disc to the hub; the improvement wherein said non-circular region of the hub comprises closely spaced V-shaped ridges (10) and troughs (11), the ridges have flank surfaces, and the central hole of the brake disc is provided with corresponding V-shaped troughs (13) and ridges (14) which are so adapted in relation to the ridges and troughs on the hub that a slip fit between the hub and disc is achieved, the bottoms of the troughs of one of the disc or hub being spaced from the tops of the ridges of the other of the disc or hub when the entire flank surfaces of the ridges are in contact with the troughs.

2. Arrangement according to claim 1, wherein the lead angle (β) of the flanks of the ridges (10, 14) lies between 40° and 65°.

3. Arrangement according to claim 2, wherein the lead angle (β) of the flanks of the ridges (10, 14) is approximately 52°.

4. Arrangement according to claim 1, wherein uniformly spaced axial bores (18, 21) are provided around the central hole of the disc radially externally of a plurality of troughs (13) in the disc and communicate with the base of respective adjacent troughs via slots (19) in the disc.

5. Arrangement according to claim 4, wherein an axial bore (18, 21) is provided in the disc radially inside of each trough (13) and a plurality of uniformly spaced bores (18) communicate with an adjacent trough (13).

6. Arrangement according to claim 4, wherein a plurality of said axial bores communicate with ventilation passages (20) in the disc.

7. Arrangement according to claim 1, wherein, on at least one side, the disc cooperates with an axially resilient element (26) carried by the hub, which element permits restricted axial movement of the disc relative to the hub.

8. Arrangement according to claim 1, wherein the disc is symmetrical.

9. Arrangement according to claim 1, wherein a circular channel (23), open on one side of the hub, is provided in the hub (6) radially inside of the region provided with ridges and troughs.

10. Arrangement according to claim 1, wherein the troughs have a rounded base (15) whilst the ridges have a flat upper surface (16) merging with flat flanks (17).

11. In a wheel hub and brake disc arrangement for a vehicle wheel, comprising a hub rotatably carried on a shaft portion and presenting an outwardly facing region of non-circular cross-section, and a brake disk which is carried by said region of the hub, said brake disc having a central hole, the shape of which is adapted to the shape of said non-circular cross-section to thereby provide a mutually non-rotatable attachment of the brake disc to the hub; the improvement wherein said non-circular region of the hub comprises closely spaced V-shaped ridges (10) and troughs (11), the ridges have flank surfaces, and the central hole of the brake disc is provided with corresponding V-shaped troughs (13) and ridges (14) which are so adapted in relation to the ridges and troughs on the hub that a slip fit between the hub and disc is achieved, and wherein the bottoms of the troughs of one of the disc or hub are spaced from the tops of the ridges of the other of the disc or hub when the entire flank surfaces of the ridges are in contact with the troughs.

\* \* \* \* \*